United States Patent
Haldeman et al.

(10) Patent No.: US 10,597,143 B2
(45) Date of Patent: Mar. 24, 2020

(54) LOW MOMENT ROTOR HUB

(71) Applicant: Bell Helicopter Textron Inc., Fort Worth, TX (US)

(72) Inventors: Andrew Paul Haldeman, Fort Worth, TX (US); Frank B. Stamps, Colleyville, TX (US); James Donn Hethcock, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 337 days.

(21) Appl. No.: 15/683,621

(22) Filed: Aug. 22, 2017

(65) Prior Publication Data

US 2019/0061926 A1 Feb. 28, 2019

(51) Int. Cl.
| | | |
|---|---|---|
| *B64C 11/02* | (2006.01) | |
| *B64C 27/35* | (2006.01) | |
| *B64C 11/04* | (2006.01) | |
| *B64C 11/06* | (2006.01) | |
| *B64C 27/39* | (2006.01) | |
| *B64C 27/12* | (2006.01) | |
| *B64C 27/32* | (2006.01) | |

(Continued)

(52) U.S. Cl.
CPC ............... *B64C 11/02* (2013.01); *B64C 11/04* (2013.01); *B64C 11/06* (2013.01); *B64C 27/12* (2013.01); *B64C 27/32* (2013.01); *B64C 27/35* (2013.01); *B64C 27/39* (2013.01); *B64C 27/59* (2013.01); *B64C 27/78* (2013.01)

(58) Field of Classification Search
CPC ......... B64C 11/02; B64C 11/04; B64C 11/06; B64C 27/32; B64C 27/327; B64C 27/78
See application file for complete search history.

(56) References Cited

U.S. PATENT DOCUMENTS 2,853,141 A * 9/1958 Leoni ...................... B64C 27/39
416/106
3,652,185 A 3/1972 Cresap et al.
(Continued)

FOREIGN PATENT DOCUMENTS

| DE | 2937820 A1 | 4/1981 |
|---|---|---|
| EP | 2848524 A1 | 3/2015 |

(Continued)

OTHER PUBLICATIONS

EPO Search Report issued in EP Application 17196018.0 dated May 14, 2018, 4 pages.

(Continued)

*Primary Examiner* — Nicholas McFall
(74) *Attorney, Agent, or Firm* — Patent Capital Group (57) ABSTRACT

In one embodiment, a rotor hub comprises a hub body, and a plurality of blade grips configured for attaching a plurality of rotor blades. The rotor hub further comprises a plurality of centrifugal force bearings coupled to the plurality of blade grips, wherein a focus of the plurality of centrifugal force bearings is aligned with a centerline of a rotor mast. The rotor hub further comprises a plurality of drive links configured to transfer torque to the plurality of rotor blades, wherein the plurality of drive links is positioned to correspond with a leading edge side of the plurality of rotor blades. The rotor hub further comprises a plurality of pitch horns configured to adjust a pitch of the plurality of rotor blades.

24 Claims, 5 Drawing Sheets

(51) Int. Cl.
  *B64C 27/59*  (2006.01)
  *B64C 27/78*  (2006.01)

(56) References Cited

U.S. PATENT DOCUMENTS 5,110,260 A * 5/1992 Byrnes .................... B64C 27/35
                                                    416/134 A
5,141,398 A    8/1992 Bietenhader et al.

FOREIGN PATENT DOCUMENTS

EP    3446972 A1  2/2019
WO  2014151257 A1  9/2014

OTHER PUBLICATIONS

EPO Examination Report issued in EP Application 17196018.0 dated Jun. 4, 2018, 6 pages.

* cited by examiner

LOW MOMENT ROTOR HUB

TECHNICAL FIELD

This disclosure relates generally to rotorcraft, and more particularly, though not exclusively, to rotor systems.

BACKGROUND

Rotorcraft typically include a tail rotor for anti-torque and/or directional control. The tail rotor of a rotorcraft can be implemented using a variety of designs and/or number of blades. The design of a tail rotor, however, implicates numerous performance considerations and can be a challenging aspect of rotorcraft design.

SUMMARY

According to one aspect of the present disclosure, a rotor hub comprises a hub body, and a plurality of blade grips configured for attaching a plurality of rotor blades. The rotor hub further comprises a plurality of centrifugal force bearings coupled to the plurality of blade grips, wherein a focus of the plurality of centrifugal force bearings is aligned with a centerline of a rotor mast. The rotor hub further comprises a plurality of drive links configured to transfer torque to the plurality of rotor blades, wherein the plurality of drive links is positioned to correspond with a leading edge side of the plurality of rotor blades. The rotor hub further comprises a plurality of pitch horns configured to adjust a pitch of the plurality of rotor blades.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
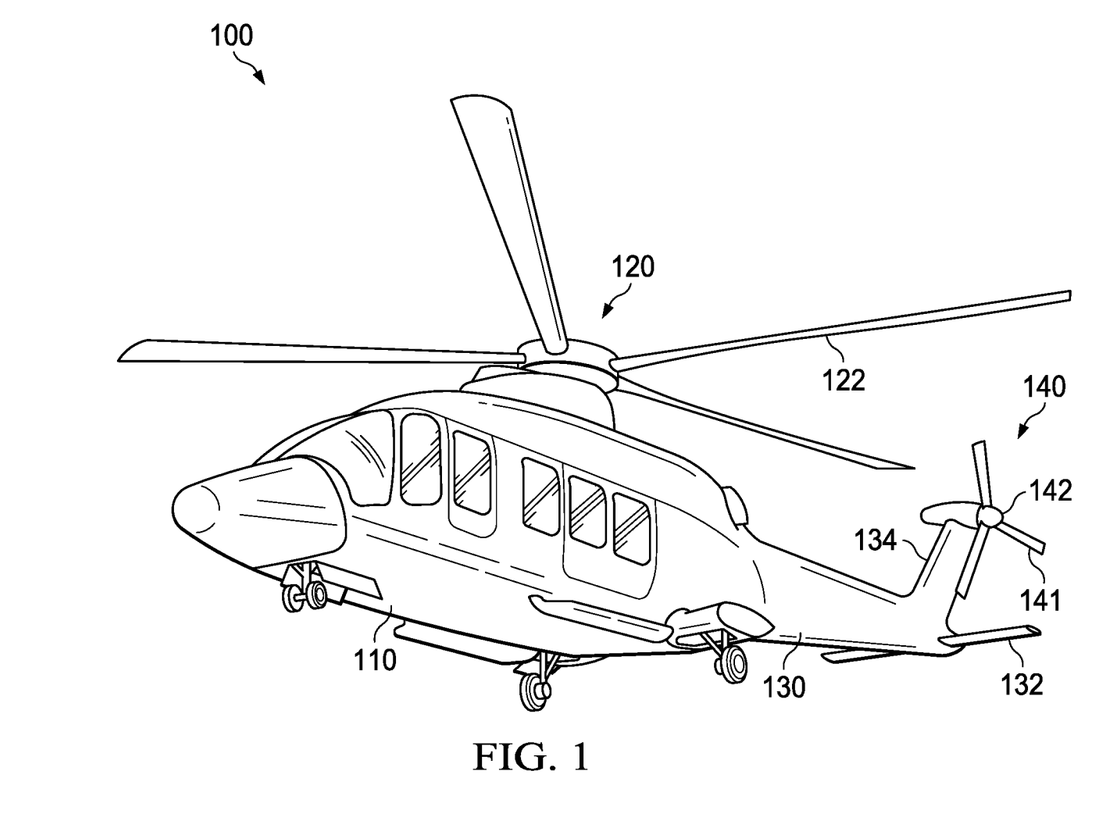
FIG. 1 illustrates an example rotorcraft in accordance with certain embodiments.

FIG. 1 illustrates an example embodiment of a rotorcraft 100. Rotorcraft 100 includes a fuselage 110, a rotor system 120, and an empennage 130. The fuselage 110 is the main body of the rotorcraft, which may include a cabin (e.g., for crew, passengers, and/or cargo) and/or may house certain mechanical and electrical components (e.g., engine(s), transmission, and/or flight controls). The rotor system 120 is used to generate lift for the rotorcraft using a plurality of rotating rotor blades 122. For example, the engine(s) of the rotorcraft can be used to generate torque to cause the rotor blades 122 to rotate, which in turn generates lift. Moreover, the pitch of each rotor blade 122 can be adjusted in order to selectively control direction, thrust, and lift for the rotorcraft. The empennage 130 of the rotorcraft includes a horizontal stabilizer 132, vertical stabilizer 134, and tail rotor 140. The horizontal stabilizer 132 and vertical stabilizer 134 respectively provide horizontal and vertical stability for the rotorcraft. Moreover, tail rotor system 140 (which includes a plurality of blades 141 coupled to a hub 142) may be used to provide anti-torque and/or direction control for the rotorcraft.

The tail rotor of a rotorcraft (e.g., tail rotor 140 of rotorcraft 100) can be implemented using a variety of designs and/or number of blades. The design of a tail rotor, however, implicates numerous performance considerations and can be a challenging aspect of rotorcraft design. In some embodiments, for example, a tail rotor may be implemented with two blades, such as a two-bladed teetering tail rotor. Increasing the performance of this style of tail rotor, however, requires the blade chord, length, and tip speed to be increased. Moreover, these performance adjustments increase the acoustic energy or noise generated by the tail rotor, which may be undesirable and/or prohibited in certain areas or circumstances (e.g., areas governed by noise restrictions or regulations, such as national parks).

Accordingly, in some embodiments, a tail rotor may be implemented using more than two blades to improve performance, while also maintaining lower tip speeds and thus reduced noise. For example, in some embodiments, a tail rotor could be implemented by stacking two hubs of a two-bladed teetering rotor in order to create a four-bladed teetering rotor. This allows for lower tip speeds (and thus reduced noise) due to the increase in solidity of the hub disk. Stacking multiple hubs, however, is not a weight-efficient approach for a tail rotor with more than two blades. Moreover, stacking the hubs may cause undesirable downwash and blade-vortex interactions on the downstream blades, which may reduce the efficiency of the tail rotor.

Accordingly, in some embodiments, a tail rotor may be implemented using an in-plane hub designed for three or more blades, thus eliminating certain drawbacks of a stacked hub design. An in-plane hub can be designed using a variety of styles. For example, in some embodiments, an in-plane hub may be implemented using a gimbal or universal joint. This style of hub, however, may pose a packaging problem due to the size of the gimbal. Moreover, this style of hub may also require four or more bearings for the gimbal and mast joint assembly, along with two or more bearings for each blade. Moreover, if a universal joint is used in lieu of a true constant velocity gimbal, in-plane vibrations (e.g., four per revolution) associated with higher flapping angles may occur. Alternatively, an in-plane hub may be implemented using discrete offset flapping hinges (e.g., with attached articulated blade grips) in order to facilitate blade pitch adjustments. This style of hub, however, may impose additional structural requirements. For example, the offset of the flapping hinge may create a larger hub moment that must be accounted for, which may entail a stiffer tail rotor mast and/or increased torsional stiffness in the tail boom. Alternatively, an in-plane hub may be implemented using a fully articulated hinge-less hub. This style of hub, however, incorporates a flapping offset similar to a hub with discrete flapping hinges, and thus is subject to similar design constraints.

Accordingly, the present disclosure describes various embodiments of a low moment rotor hub that can be adapted to support a varying number of blades (e.g., 3-5 blades). In some embodiments, for example, the hub may include a centrifugal force bearing (e.g., a spherical elastomeric bearing) for each blade that facilitates blade pitch adjustments and/or blade flapping articulation. Moreover, the centrifugal bearing may be positioned so that its focus is coincident with the mast centerline, thus reducing hub moments. The hub may be further coupled to each associated blade using a drive link positioned using an orientation that achieves the desired kinematic coupling throughout the range of blade motions.

In this manner, the described embodiments provide a rotor hub with low hub moments, high solidity, and a flexible in-plane design that supports more than two blades. The described hub design produces near zero hub moments, for example, and thus results in reduced loads. Accordingly, the described hub design is compatible with existing aircraft components designed for other types of rotor hubs with near zero hub moments. For example, the described hub design may be used with airframe and drive system components (e.g., a tail boom and/or tail rotor mast) designed for a two-bladed teetering tail rotor with near zero hub moments. Moreover, the ability to support more than two rotor blades allows desired performance targets to be achieved while maintaining low noise. In addition, the in-plane hub design reduces undesirable blade downwash and vortex interactions that occur for certain hub designs, such as stacked hub designs. The described hub design is also more compact and requires fewer bearings than other types of hubs, such as gimbaled hubs.

Example embodiments of a low moment rotor hub are described below with more particular reference to the remaining FIGURES. It should be appreciated that rotorcraft 100 of FIG. 1 is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples. Moreover, the described embodiments can also be used for other non-aircraft implementations, including land, water, and/or space-based vehicles, among other examples.

Figure 2:
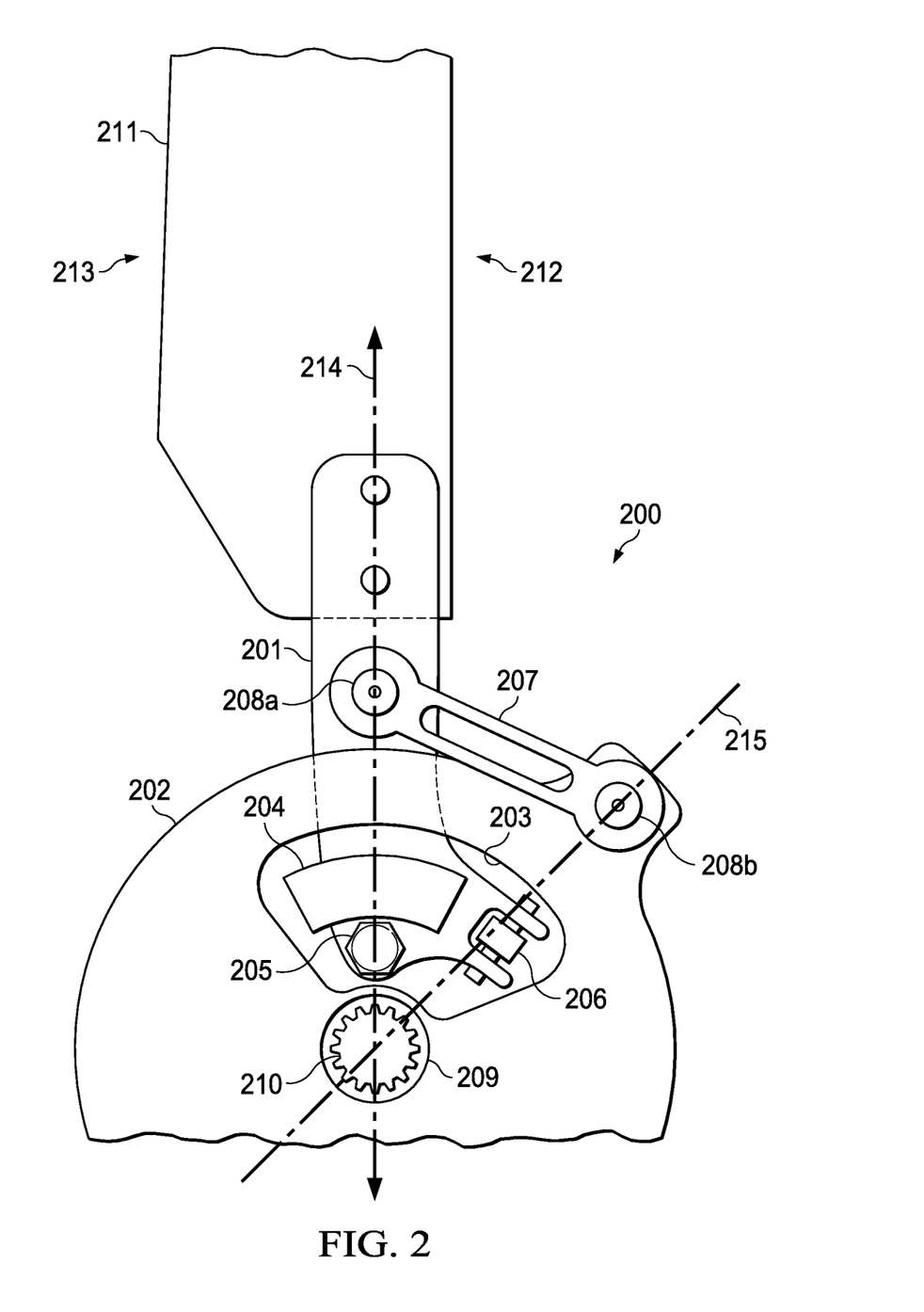
FIG. 2 illustrates an example embodiment of a low moment rotor hub.

FIG. 2 illustrates an example embodiment of a low moment rotor hub 200. In some embodiments, for example, rotor hub 200 could be used as a hub for the tail rotor of a rotorcraft (e.g., rotorcraft 100 of FIG. 1). The illustrated rotor hub 200 is stiff-in-plane, produces near zero hub moments, and can be adapted to support a varying number of blades 211. For simplicity, a partial view of rotor hub 200 is shown to illustrate its design with respect to a particular rotor blade 211. In actual embodiments, however, rotor hub 200 may be designed to support any number of rotor blades 211 (e.g., as illustrated and described in connection with FIGS. 3-5).

In the illustrated embodiment, rotor hub 200 includes a hub body 202 coupled to a blade grip or yoke 201, which is fastened to a rotor blade 211. Hub body 202 includes a center aperture 209 for the rotor mast 210. Hub body 202 also includes an aperture 203 for certain components associated with rotor blade 211. In some embodiments, for example, hub body 202 may have a "wagon wheel" design with evenly-spaced apertures 203 for each associated rotor blade 211 of rotor hub 200.

Rotor hub 200 further includes a pitch horn 206 to adjust the pitch of blade 211 along a pitch change axis (PCA) 214. In the illustrated embodiment, pitch horn 206 is positioned on rotor hub 200 on the leading edge 212 side of rotor blade 211, thus aligning pitch horn 206 with flapping axis 215, and resulting in a positive delta-3 angle (e.g., approximately 45 degrees). In this manner, pitch-flap coupling is achieved with respect to the flapping axis 215, thus causing the angle of attack or pitch of blade 211 to automatically adjust in response to flapping (e.g., without any action from pitch horn 206). For example, when blade 211 flaps up the pitch increases, and when blade 211 flaps down the pitch decreases. In other embodiments, however, pitch horn 206 may be positioned in other locations on rotor hub 200 to achieve other delta-3 angles and behavior. In some embodiments, for example, pitch horn 206 may be positioned on the opposite side of rotor hub 200 (e.g., the trailing edge 213 side of rotor blade 211) to achieve a negative delta-3 angle, thus resulting in a flap-up pitch-down coupling. Accordingly, rotor hub 200 can be designed using either positive or negative delta-3 angles.

Rotor hub 200 further includes a centrifugal force bearing 204, which may be fastened using a static fastener 205. Centrifugal force bearing 204 enables the orientation of rotor blade 211 to be adjusted. For example, centrifugal force bearing 204 may facilitate pitch adjustments and/or flapping articulation for rotor blade 211. In some embodiments, for example, centrifugal bearing 204 may be a spherical elastomeric bearing, and static fastener 205 may be any type of fastener, such as a retention bolt. Moreover, rotor hub 200 is designed with centrifugal bearing 204 positioned so that its focus is coincident with the centerline of the tail rotor mast 210, thus reducing hub moments. For example, compared to a typical fully articulated hub, centrifugal bearing 204 is rotated (e.g., by approximately 180 degrees) to point inboard. In this manner, the focus of centrifugal bearing 204 is placed coincident with the mast 210 centerline, thus simulating the kinematic articulation of a teetering or gimbaled hub and reducing hub moments.

Rotor hub 200 further includes a drive link 207 to facilitate the transfer of torque and provide the appropriate kinematic blade coupling. In some embodiments, for example, drive link 207 may be a rigid link with attachment points 208a,b at each end. In some embodiments, attachment points 208a,b may be fastened using spherical bearings, such as monoballs. In addition, in some embodiments, the bearings for attachment points 208a,b may be formed using tetrafluoroethylene (TFE), an elastomer, and/or any other suitable compound or bearing material. Drive link 207 may be fastened to blade grip 201 using attachment point 208a to facilitate blade flapping, and drive link 207 may be attached to hub body 202 using attachment point 208b to facilitate blade feathering. Moreover, drive link 207 may be positioned with an approximately chord-wise orientation. For example, attachment points 208a,b of drive link 207 are selectively attached to certain locations of hub body 202 and blade grip 201 in order to position drive link 207 using an orientation that provides the desired kinematic coupling throughout the range of blade motions. For example, drive link 207 is positioned with an appropriate orientation to transfer torque between mast 210 and blade 211 and to set the delta-3 axis. In this manner, the kinematics of drive link 207 eliminate coupling during blade feathering and account for lead motion during blade flapping.

For example, in some embodiments, attachment point 208a of drive link 207 may be attached to the blade grip 201 along the pitch change axis (PCA) 214 (e.g., outboard of centrifugal bearing 204). Drive link 207 is also positioned on the leading edge 212 side of blade 211 rather than the trailing edge 213 side. As blade 211 flaps in the direction of thrust, it will advance or lead. Accordingly, by placing drive link 207 on the leading edge 212 side of blade 211, the foreshortening of drive link 207 due to pivoting during blade flapping can closely match the leading displacement due to Coriolis of the drive link attachment point 208a on the blade grip 201. In this manner, the design of rotor hub 200 (e.g., including the arrangement of centrifugal bearing 204 and drive link 207) may eliminate the need for a shear restraint bearing inboard of centrifugal bearing 204.

Accordingly, rotor hub 200 can accommodate more than two blades, while still achieving low hub moments and only requiring three bearings for each associated rotor blade (e.g., centrifugal bearing 204 and bearings for attachment points 208a,b of drive link 207). For example, rotor hub 200 can achieve near zero hub moments similar to a gimbaled hub, but using fewer bearings similar to a fully articulated hub, and without requiring the lead/lag dampers of a fully articulated hub. In this manner, rotor hub 200 has a stiff-in-plane design but exhibits certain behavior of a soft-in-plane design.

Figure 3:
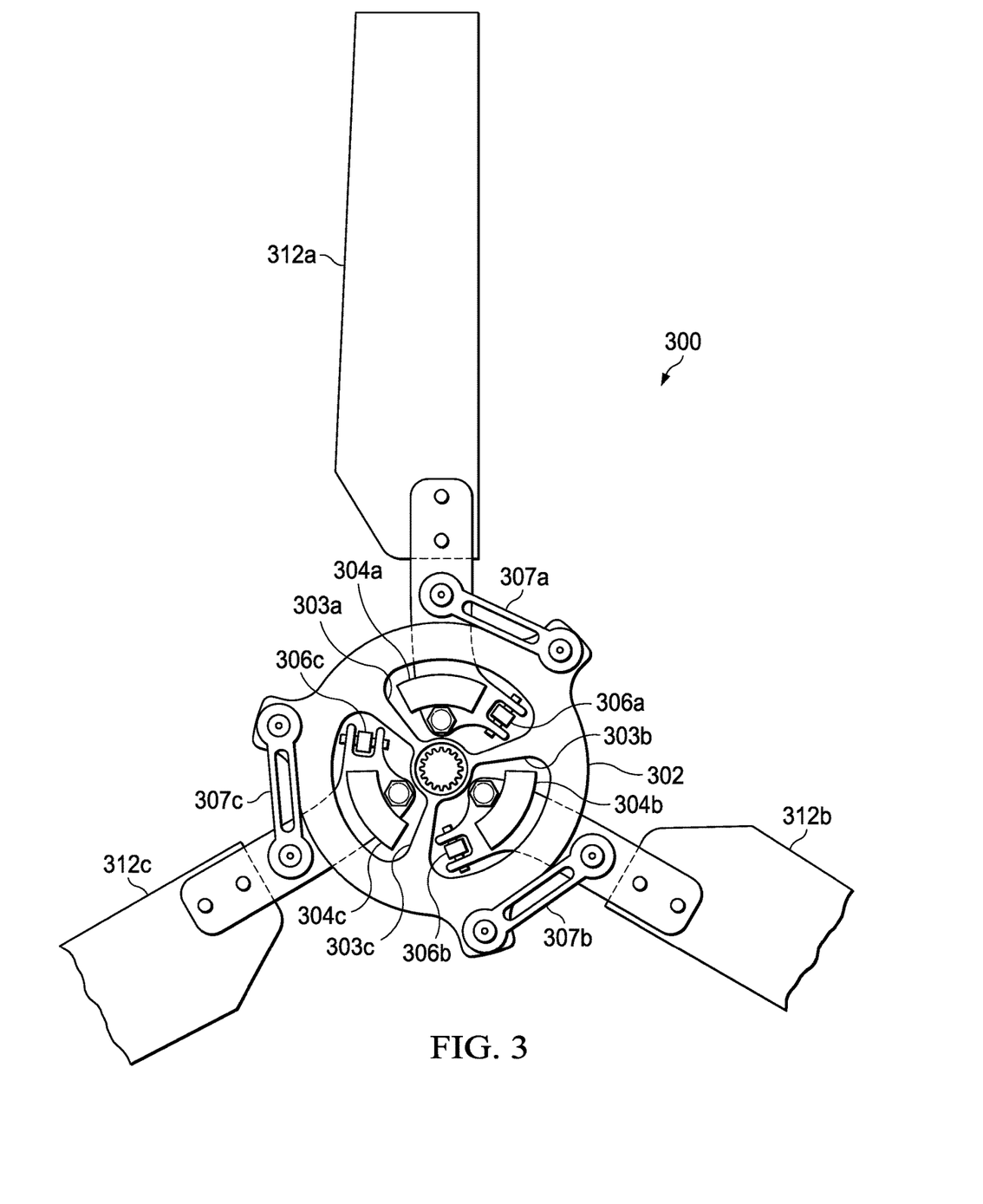
FIGS. 3, 4, and 5 illustrate example embodiments of a tail rotor with a low moment hub.
Figure 4:
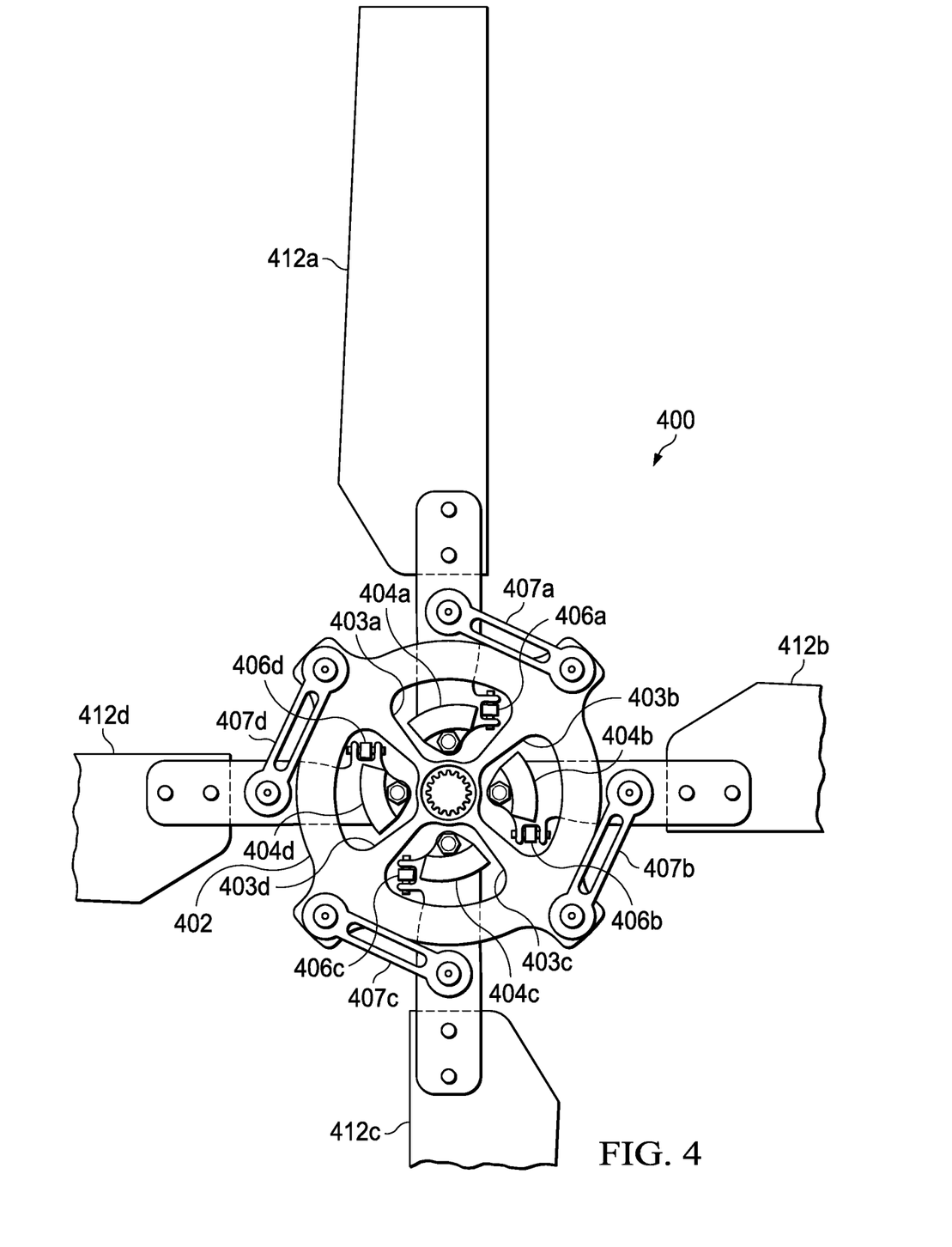
Figure 5:
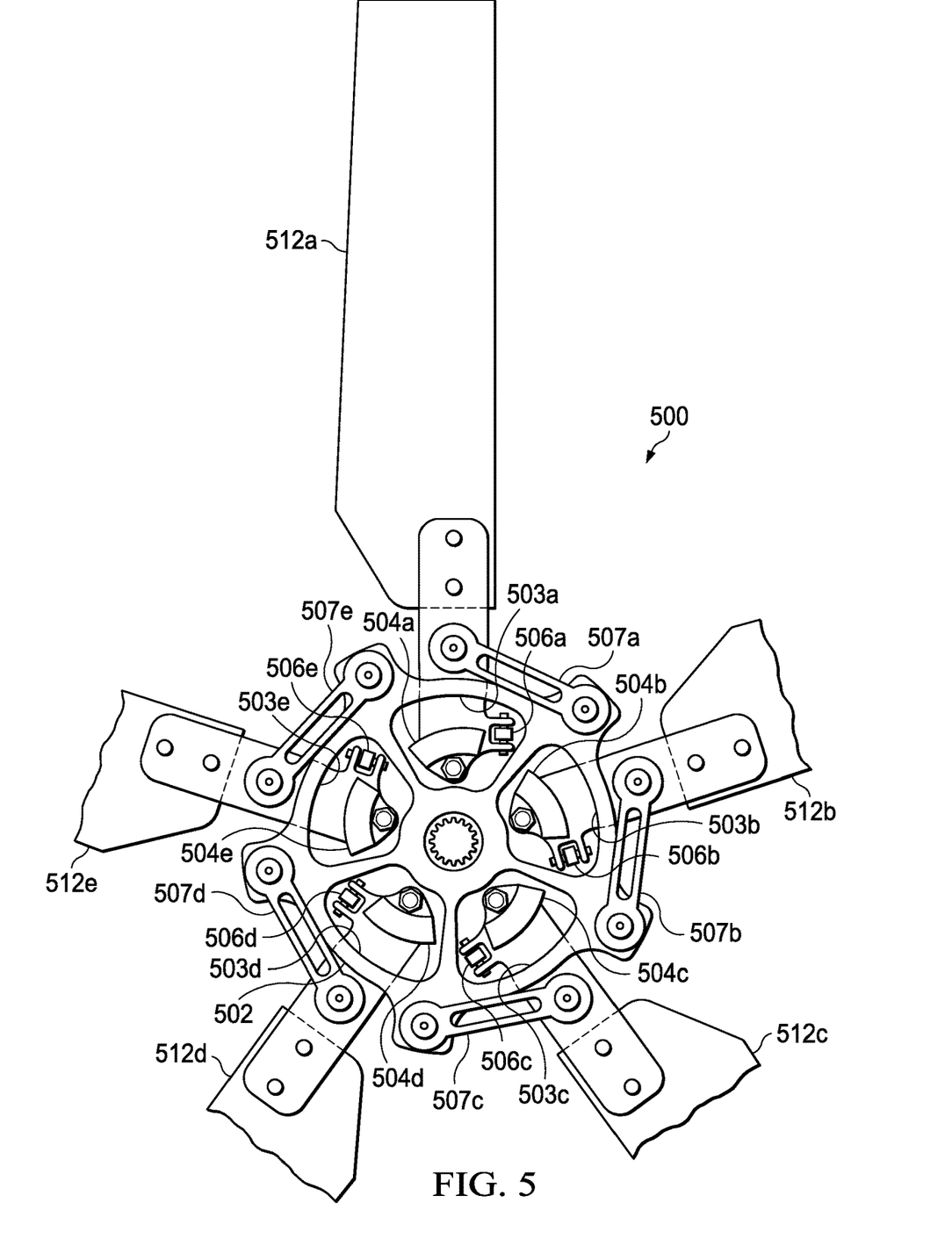

FIGS. 3-5 illustrate example embodiments of a tail rotor with a low moment hub. In some embodiments, for example, the tail rotor embodiments of FIGS. 3-5 may be implemented using rotor hub 200 of FIG. 2.

For example, FIG. 3 illustrates a tail rotor 300 with three blades 312a-c attached to rotor hub 302. For each blade 312a-c, rotor hub 302 may include the components described above in connection with rotor hub 200 of FIG. 2. For example, for each blade 312, rotor hub 302 may include an aperture 303, centrifugal bearing 304, drive link 307, and pitch horn 306. Moreover, the apertures 303a-c may be spaced approximately evenly (e.g., 120 degrees of spacing for three apertures and blades).

Similarly, FIG. 4 illustrates a tail rotor 400 with four blades 412a-d attached to rotor hub 402. For each blade 412a-d, rotor hub 402 may include the components described above in connection with rotor hub 200 of FIG. 2. For example, for each blade 412, rotor hub 402 may include an aperture 403, centrifugal bearing 404, drive link 407, and pitch horn 406. Moreover, the apertures 403a-d may be spaced approximately evenly (e.g., 90 degrees of spacing for four apertures and blades).

Similarly, FIG. 5 illustrates a tail rotor 500 with five blades 512a-e attached to rotor hub 502. For each blade 512a-e, rotor hub 502 may include the components described above in connection with rotor hub 200 of FIG. 2. For example, for each blade 512, rotor hub 502 may include an aperture 503, centrifugal bearing 504, drive link 507, and pitch horn 506. Moreover, the apertures 503a-e may be spaced approximately evenly (e.g., 72 degrees of spacing for five apertures and blades).

In this manner, rotor hub 200 of FIG. 2 can be used for a tail rotor with any number of blades.

The FIGURES illustrate the architecture, functionality, and operation of possible implementations of various embodiments of the present disclosure. Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A rotor hub, comprising:
   a hub body;
   a plurality of blade grips configured for attaching a respective one of a plurality of rotor blades;
   a plurality of centrifugal force bearings coupled to the plurality of blade grips, wherein a focus of the plurality of centrifugal force bearings is aligned with a centerline of a rotor mast;
   a plurality of drive links configured to transfer torque to the plurality of rotor blades; and
   a plurality of pitch horns configured to adjust a pitch of the plurality of rotor blades;
   wherein each drive link of the plurality of drive links is coupled to the hub body via a first attachment point and to a blade grip of the plurality of blade grips via a second attachment point and wherein the first attachment point of each drive link of the plurality of drive links is disposed on a leading edge side of the respective one of the plurality of rotor blades.

2. The rotor hub of claim 1, wherein the plurality of centrifugal force bearings enables an orientation of the plurality of rotor blades to be adjusted.

3. The rotor hub of claim 1, wherein the plurality of centrifugal force bearings comprises a plurality of elastomeric bearings.

4. The rotor hub of claim 3, wherein the plurality of elastomeric bearings comprises a plurality of spherical elastomeric bearings.

5. The rotor hub of claim 1, further comprising a plurality of retention bolts coupled to the plurality of centrifugal force bearings.

6. The rotor hub of claim 1, wherein each of the first attachment points comprises a first bearing, and wherein each of the second attachment points comprises a second bearing.

7. The rotor hub of claim 6, wherein each of the first bearings and the second bearings comprise a monoball bearing.

8. The rotor hub of claim 1, wherein the hub body comprises a mast aperture configured to interface with the rotor mast.

9. The rotor hub of claim 1, wherein the hub body comprises a plurality of blade apertures associated with the plurality of rotor blades.

10. The rotor hub of claim 1, wherein each pitch horn of the plurality of pitch horns is aligned with a flapping axis of an associated rotor blade of the plurality of rotor blades.

11. The rotor hub of claim 10, wherein a pitch of the associated rotor blade is configured to adjust automatically based on a flapping movement of the associated rotor blade.

12. A tail rotor, comprising:
a plurality of rotor blades;
a rotor mast; and
a rotor hub, comprising:
a hub body;
a plurality of blade grips coupled to a respective one of the plurality of rotor blades;
a plurality of centrifugal force bearings coupled to the plurality of blade grips, wherein a focus of the plurality of centrifugal force bearings is aligned with a centerline of the rotor mast;
a plurality of drive links configured to transfer torque to the plurality of rotor blades; and
a plurality of pitch horns configured to adjust a pitch of the plurality of rotor blades;
wherein each drive link of the plurality of drive links is coupled to the hub body via a first attachment point and to a blade grip of the plurality of blade grips via a second attachment point and wherein the first attachment point of each drive link of the plurality of drive links is disposed on a leading edge side of the respective one of the plurality of rotor blades.

13. The tail rotor of claim 12, wherein the plurality of centrifugal force bearings enables an orientation of the plurality of rotor blades to be adjusted.

14. The tail rotor of claim 12, wherein the plurality of centrifugal force bearings comprises a plurality of elastomeric bearings.

15. The tail rotor of claim 14, wherein the plurality of elastomeric bearings comprises a plurality of spherical elastomeric bearings.

16. The tail rotor of claim 12:
wherein each of the first attachment points comprises a first bearing, and wherein each of the second attachment points comprises a second bearing.

17. The tail rotor of claim 16, wherein each of the first bearings and the second bearings comprise a monoball bearing.

18. The tail rotor of claim 12, wherein the hub body comprises a plurality of blade apertures associated with the plurality of rotor blades.

19. The tail rotor of claim 12, wherein each pitch horn of the plurality of pitch horns is aligned with a flapping axis of an associated rotor blade of the plurality of rotor blades.

20. A rotorcraft, comprising:
a fuselage; and
a rotor, comprising:
a plurality of rotor blades;
a rotor mast; and
a rotor hub, comprising:
a hub body;
a plurality of blade grips coupled to a respective one of the plurality of rotor blades;
a plurality of centrifugal force bearings coupled to the plurality of blade grips, wherein a focus of the plurality of centrifugal force bearings is aligned with a centerline of the rotor mast;
a plurality of drive links configured to transfer torque to the plurality of rotor blades; and
a plurality of pitch horns configured to adjust a pitch of the plurality of rotor blades;
wherein each drive link of the plurality of drive links is coupled to the hub body via a first attachment point and to a blade grip of the plurality of blade grips via a second attachment point and wherein the first attachment point of each drive link of the plurality of drive links is disposed on a leading edge side of the respective one of the plurality of rotor blades.

21. The rotorcraft of claim 20, wherein the plurality of centrifugal force bearings enables an orientation of the plurality of rotor blades to be adjusted.

22. The rotorcraft of claim 20, wherein the plurality of centrifugal force bearings comprises a plurality of elastomeric bearings.

23. The rotorcraft of claim 20:
wherein each of the first attachment points comprises a first bearing, and wherein each of the second attachment points comprises a second bearing.

24. The rotorcraft of claim 20, wherein each pitch horn of the plurality of pitch horns is aligned with a flapping axis of an associated rotor blade of the plurality of rotor blades.

* * * * *